(12) United States Patent
Wiese

(10) Patent No.: US 9,188,068 B2
(45) Date of Patent: Nov. 17, 2015

(54) SYSTEM AND APPARATUS FOR USE OF PURGE GAS TO TERMINATE INTERNAL COMBUSTION ENGINE OPERATION

(76) Inventor: Arthur R Wiese, Lincoln, NE (US)

( * ) Notice: Subject to any disclaimer, the term of this patent is extended or adjusted under 35 U.S.C. 154(b) by 672 days.

(21) Appl. No.: 13/482,987

(22) Filed: May 29, 2012

(65) Prior Publication Data
US 2012/0304961 A1  Dec. 6, 2012

Related U.S. Application Data

(60) Provisional application No. 61/519,823, filed on May 31, 2011.

(51) Int. Cl.
| | |
|---|---|
| *F02M 25/07* | (2006.01) |
| *F02D 17/04* | (2006.01) |
| *A62C 3/07* | (2006.01) |
| *F01D 19/00* | (2006.01) |
| *F02M 25/10* | (2006.01) |

(52) U.S. Cl.
CPC . *F02D 17/04* (2013.01); *A62C 3/07* (2013.01); *F01D 19/00* (2013.01); *F02M 25/10* (2013.01); *Y02T 10/121* (2013.01)

(58) Field of Classification Search
CPC ......... F01D 19/00; F01D 21/00; F02C 7/232; F02C 7/26; F02C 9/40
USPC ......... 123/330, 568.17, 568.18, 559.1, 559.2; 60/605.2; 701/108
See application file for complete search history.

(56) References Cited

U.S. PATENT DOCUMENTS

| | | | | |
|---|---|---|---|---|
| 5,154,238 | A * | 10/1992 | Buchan .......................... | 169/62 |
| 8,069,665 | B2 * | 12/2011 | Pursifull et al. ............... | 60/611 |
| 2003/0154716 | A1* | 8/2003 | Redon .......................... | 60/605.2 |
| 2009/0314001 | A1* | 12/2009 | Tanaka et al. .................. | 60/772 |

\* cited by examiner

*Primary Examiner* — Hai Huynh
*Assistant Examiner* — Gonzalo Laguarda

(57) ABSTRACT

A purge gas injection system for internal combustion engines is disclosed. The system comprises a purge gas container filled with a sufficient purge gas to interrupt the combustion cycle of the engine, equipped with a controllable flow device capable of initiating and terminating flow from the container upon demand, with tubing connected to the purge gas container to direct the purge gas to a nozzle mounted on the combustion air intake of the engine. The system can be operated whenever the undesired conditions of dieseling or engine run-on are experienced and the operator of the engine may cause the purge gas to flow into the combustion air intake to defeat the undesirable run-on conditions.

13 Claims, 7 Drawing Sheets

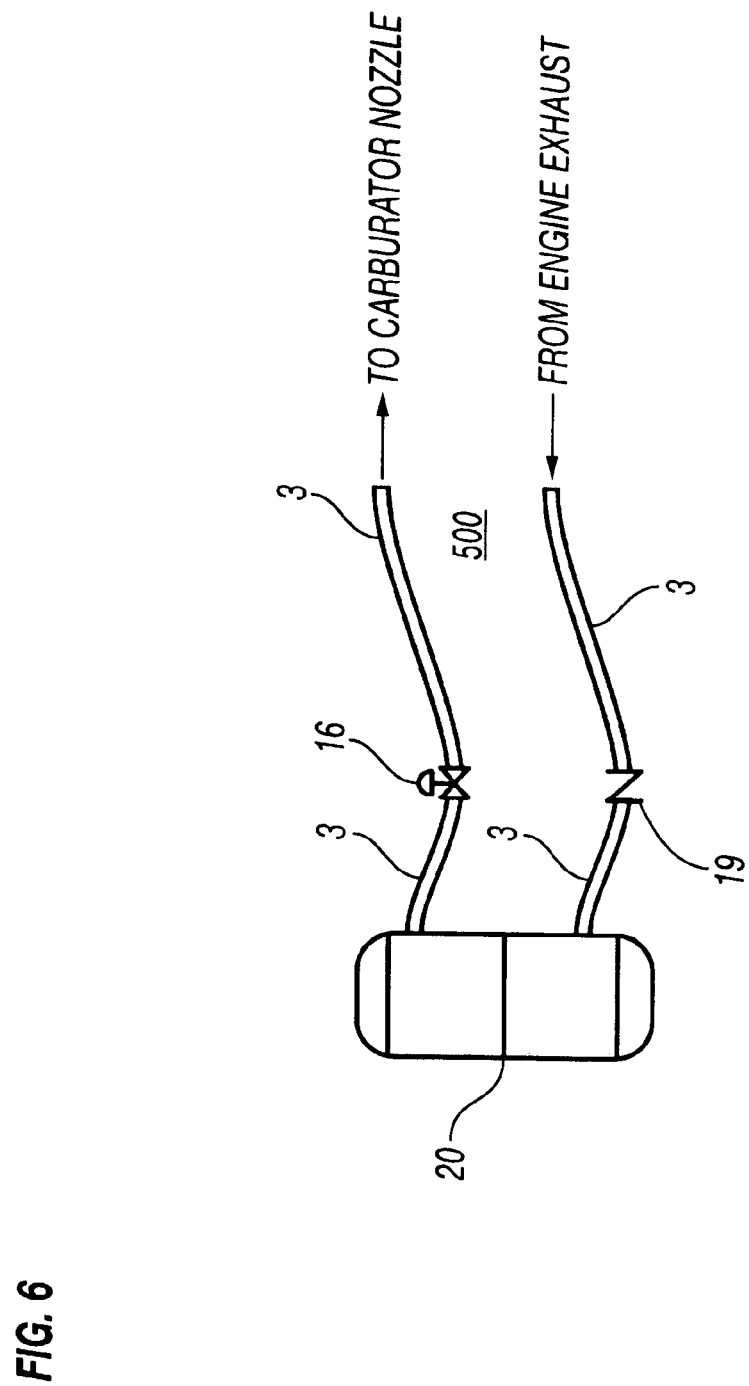

SYSTEM AND APPARATUS FOR USE OF PURGE GAS TO TERMINATE INTERNAL COMBUSTION ENGINE OPERATION

BACKGROUND OF THE INVENTION

1. Field of the Invention

The present invention relates generally to the implementation of a system implemented to rapidly insert a purge gas into the combustion intake of a carbureted or non-carbureted liquid or gaseous fueled engine to interrupt undesired dieseling or "run on" by rapid alteration of the air-fuel ratio away from the stoichiometric air-fuel ratio necessary to continue operation of the engine under these conditions. This concept can be readily implemented on any internal combustion power cycle mechanical system.

2. Background and Description of the Related Art

In many instances operators of carbureted engines experience continued run on after the ignition system has been turned off. Additionally, there may be instances where fuel shut-off in a diesel engine is impaired or incomplete. In those instances where engine shut-off is a safety issue, there can be danger to the operator or others and a related hazard to human health and safety. In view of the forgoing, there is a need for improved systems to assist users of internal combustion engines to quickly stop engines experiencing such post shut-off dieseling.

In the case of carbureted engines, one of the principal issues causing improper shut down of carbureted engines is engine run on due to "dieseling", even when following the normally prescribed operator actions. Under certain conditions, such engines continue running even when the spark plugs are not firing (i.e. Ignition is OFF). The cause of the "dieseling" is due to having an adequate mixture of fuel and oxygen and an uncontrolled ignition source in the combustion chamber. Typically the ignition source should be eliminated by shutting down the spark to the spark plug. However, under certain conditions, compression of the fuel/air mixture and the temperature of the engine or fuel may produce enough heat produce an uncontrolled ignition of the fuel and, consequently, undesired run on. Operation of the engine in this mode can lead to engine damage and hazards to the engine operator or others near to or involved with the operation of the engine or other machinery powered by the engine.

The inventor of the concepts disclosed herein experienced this problem with his carbureted boat engine, which operates on regular, unleaded fuel (87 octane recommended). The problem most often would occur after operating the boat under nearly full power conditions for an extended time and then, following the recommended practices for operating the boat, placing the throttle in neutral and attempting to shut the engine off using only the ignition switch. The expectation of this ignition shut-off is the safe shutdown of the engine and reducing the risk of a turning propeller to attend to persons needing assistance to get into the boat, coming to the aid of another boater, arrival at a dock or beaching destination or other reasons that it might be desirable to cease engine operation. In a substantial number of instances, the engine would continue to run (to "diesel") even after when the ignition system was placed in the "OFF" position. Consequently, to achieve complete engine shut down, the ignition key was placed back in the "ON" position and operate the engine at idle speed for a sufficient time to lower the engine operating temperature. Once the engine temperature was low enough, it would not "diesel" when the key was placed to "OFF" and the engine successfully shut down. The problem introduced by this mode of operation is that such timing, in many instances, was longer than the desired shutdown time and, also, depending on conditions, an indeterminate amount of time. The latter issue perhaps caused by variance in the start temperature and resulting, for some instances, in the need for multiple attempts at cool down idle times before the engine could be stopped.

Research of potential solutions for this problem included consulting with several boat shop owners and the boat engine manufacturer. This research concluded this dieseling run-on was a common problem attributed to the compression ratio in the engine and current fuel formulations used in the engine. Other contributors were determined to include the engine model, service conditions, cooling configurations, fuel type used, and other conditions that influence the development of an uncontrolled ignition source in the combustion chamber of the engine. A mechanical solution was available from the manufacturer, which addressed the problem by mechanical isolation of the air-fuel mixture flowing out of the carburetor and through the intake system to stop the run-on after engine shut off. The manufacturer's other recommendations and suggestions included altering the operating conditions that might enable dieseling by using a lower thermostat setting, using lower temperature spark plugs, or increasing ventilation to the engine compartment. Further review of boat owner web sites shows these solutions do not always solve the problem, nor were they successful in terms of acceptable results for this applicant.

The solution offered here is to introduce a purge gas to the intake combustion air scheme enabling a rapid change in the air-fuel ratio away from stoichiometric air-fuel ratio in the combustion chamber by providing a burst of a selected purge gas to the engine air intake or carburetor when the "dieseling" conditions are present. In addition, if the purge gas is obtained from a compressed gas container, the expansion of the gas will also provide a cooling effect that also helps to eliminate the ignition source. The purge gas can be any number of gas types, inert or otherwise, that are introduced to the air intake, carburetion or fuel mixture distribution systems on the engine to rapidly change the air-fuel mixture and, consequently, interrupt the engine run-on by starving the combustion process. This is an improvement over those solutions previously identified and would be preferred for the following reasons:

Many of the embodiments presented here can be implemented with simple additions or modifications to the current engine application. Thus, there is minimal cost to add to existing or new engines, It is a reliable method that can be used to address multiple conditions such as carbon build up, bad spark plugs, and other problems that may promote engine run-on/dieseling.

It is simple to use apply and use. It can be designed for automatic or manual mechanical or electro-mechanical operation.

It requires minimal operator action and could be fully automated to operate when needed without any operator action It is only used when necessary. In other words, if operation of the engine will not result in a dieseling problem (such as when the engine has operated at low/idle speed just prior to shutdown), the solution is not applied.

It can be safely used on any internal combustion engine or other mechanical power source of similar configuration.

It can be used in combination with other solutions if redundancy is desirable or necessary. And if, so applied, does not interfere with those other means.

Embodiments of the present invention described in the following provide further evidence of the advantages listed above. As such, features and alternate considerations that promote those advantages will be highlighted.

SUMMARY

The invention disclosed herein enables the rapid introduction of purge gases into the combustion air intake of engines which may be experiencing undesirable dieseling or run-on. One embodiment of the proposed solution uses a container of purge gas which has been fitted with a means for controlling the release of the gas and actuator means for controllable flow of the purge case through a tube directing the purge gas to the carburetor or other intake for the engine. The purge gas may be an inert or other type of gas that is sufficient to alter the fuel air mixture away from the stoichiometric air-fuel ratio necessary to continue operation of the engine under these conditions. This embodiment uses a manual means to initiate and terminate the purge gas.

In another embodiment, the purge gas system used remote mechanical means to operate the controllable gas release means which, in one embodiment, is a manual control valve. In yet another embodiment, the manual means is augmented or replaced by an electro-mechanical implementation using electrically powered valves and an electrical signal to actuate the system.

In still another embodiment, a container is used to controllably or on demand directly or indirectly recycle combustion exhaust gases back to the combustion air intake to terminate the dieseling or run-on. All embodiments rely on some form of purge gas to interrupt continued combustion and, hence, interrupt the continued and undesirable engine run-on.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIG. 2.$b$ shows an alternate location for the nozzle depicted in FIG. 2.$a$.

FIG. 2.$c$ shows an arrangement where the purge gas is introduced directly into an engine intake manifold.

FIG. 6 shows a tank device used to capture and store the combustion byproducts as the purge gas.

DETAILED DESCRIPTION

Figure 1:
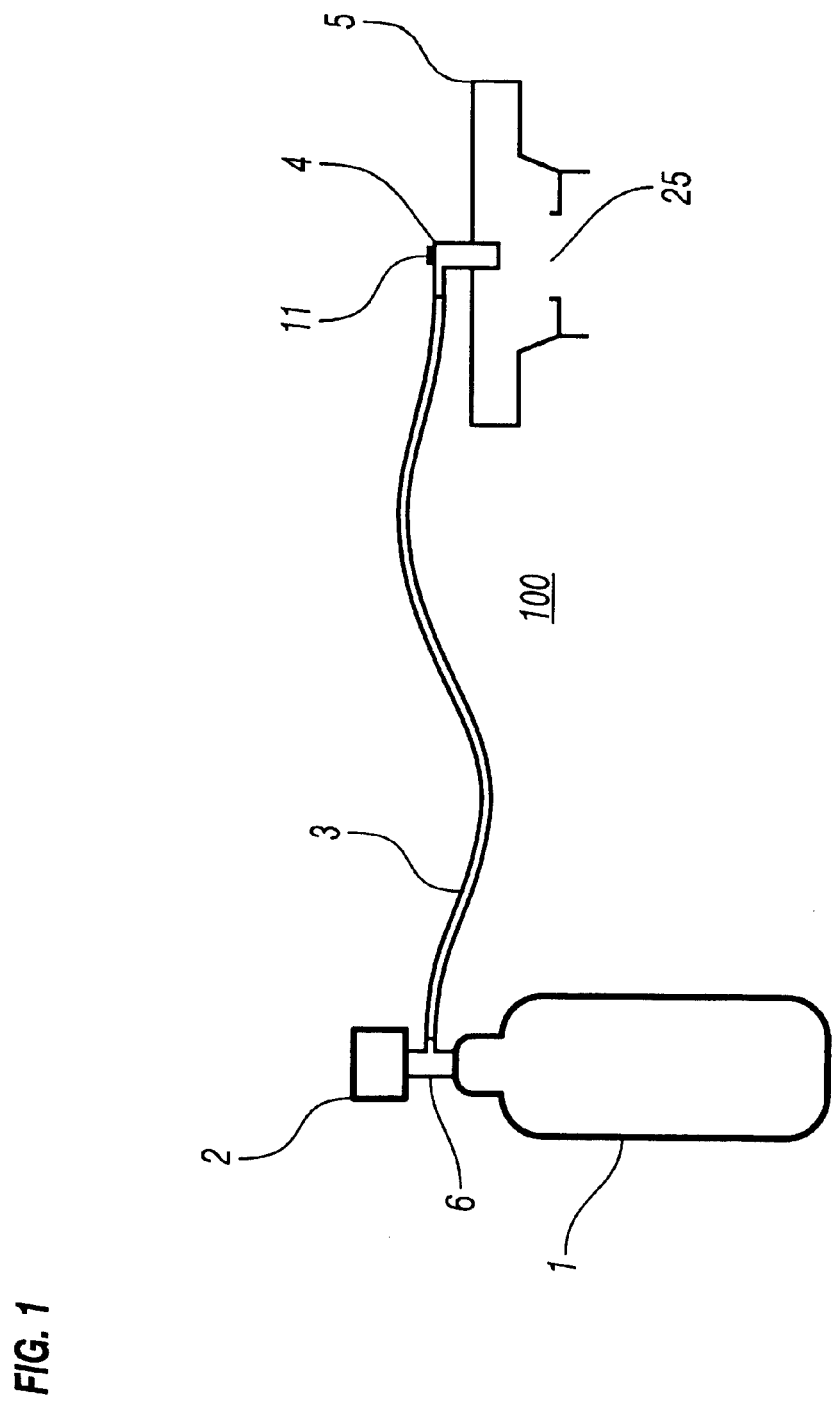
FIG. 1 shows an implementation of the proposed solution to introduce purge gas into the combustion intake of a carbureted engine. A container of purge gas is fitted with a means for controlling the release of the gas and actuator means for control of the flow through a tube directing the purge gas to the carburetor or other intake for the engine.

An invention is disclosed for the implementation of an apparatus or system to interrupt combustion in an internal combustion engine. Such an invention is desirable in those applications where dieseling or run-on might occur after shut-off of the ignition system and such run-on is not desired for reasons of operating preference or safety. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Throughout this disclosure, the gas used for interruption of engine combustion is referred to as purge gas, inert gas or other more specific terms. When considering the embodiments described herein, the gas most appropriate to an individual application should be selected to ensure rapid alteration of the air-fuel ratio away from stoichiometric air-fuel ratio and interrupt the dieseling or run-on. As such, in any embodiment where the purge gas is described and exemplary description notes that carbon dioxide, $CO_2$, or nitrogen, $N_2$, could be used; it is not intended to limit the invention scope. The selection of purge gas may depend on the resources available to a person of skill implementing the invention and are not intended to be limiting in any way. As such, any of the gases used in examples might be substituted in the particular embodiment of the invention by inert gases such as Helium (He), Neon (Ne), Nitrogen ($N_2$), Argon (Ar), Krypton (Kr), Xenon (Xe) or by other gases that are compatible with the device or engine design such as Oxygen ($O_2$), engine exhaust gases, or water vapor and be within the scope of contemplated embodiments. It is the function of the selected purge gas to be safely introduced to rapidly alter of the air-fuel ratio away from stoichiometric air-fuel ratio and interrupt the dieseling or run-on being experienced in the internal combustion engine or other power cycle device. All of these gases described here can be interchanged in alternate embodiments and still accomplish the intent of the invention.

Additionally, in many of the exemplary embodiments described herein, considerations might be described for implementation in a boat with a carbureted engine, but these too are not intended to impose any limitations on the scope of the invention embodiments described here. As a matter of example, the term carburetor inlet or intake manifold are used herein; but the term intake plenum, intake area, or intake chamber can be substituted for manifold, and the same result accomplished for an alternate configuration. Additionally, a person of skill would obviously appreciate the exemplary embodiments, configurations and features could readily could be used in other types of vehicles or systems that have a problem with engine dieseling or run-on such as automobile, recreational vehicles, gas turbines, jet turbines, or any other device designed to output mechanical power as a result of an internal combustion power cycle.

FIG. 1 shows an implementation 100 of the proposed solution to introduce purge gas into the combustion intake 5 of a carbureted engine. A container of purge gas is fitted with a means for controlling the release of the gas and actuator means for control of the flow through a tube directing the purge gas to the carburetor or other intake for the engine. In the embodiment disclosed in FIG. 1, container of purge gas 1 is arranged with an actuator 2 to initiate a means 6 for controlling the release of the inert gas and directing it into tubing 3 that connects the purge gas container to a nozzle 4 located, in this embodiment, on the carburetor housing 5. The nozzle 4 is configured, located and oriented to direct the purge gas into the carbureted engine intake manifold. Finally, in FIG. 1 the nozzle 4 that directs the purge gas to the carburetor inlet is held down and secured by a fastener 11, which in at least one embodiment, can be a nut 11 on the housing threaded rod 26.

When choosing the location and orientation of the nozzle in this embodiment the volume and the rate of flow of the purge gas into the carburetor or intake manifold, the volume of the intake manifold or intake plenum and resulting air-fuel ratios in downstream distribution systems should be factored into an objective of the solution to cause the rapid alteration of the air-fuel ratio away from stoichiometric air-fuel ratio and interrupt the dieseling or run-on. Additionally, any interference in the carburetor that may impede the flow of the purge gas into the intake manifold, or affect normal operation of the engine, should be considered.

In the embodiment illustrated in FIG. 1 the control means is a valve, but a person of skill would appreciate there are many implementation options and that depending on the pressure of the purge gas, a pressure regulator might be necessary. Additionally, in other embodiments implemented consistent with FIG. 1, the control means 6 could be augmented with a flow metering or flow limiting devices such as a metering valve, flow restricting orifice, accumulator chamber, or other means intended to ensure a specific or controlled volume and flow rate of purge gas is sent to the engine's combustion air intake system. Control means or valve 6 could also be located anywhere along the path of tubing 3 provided there is a means for its manipulation to the open, closed or proper regulation position or setting needed to accomplish the rapid purge.

In some embodiments, the purge gas or CO2 container 1 will be a commercially available container rated for the pressure and temperature of the purge gas being used. In other embodiments, depending on the scale of the application, the gas container 1 may be larger and be considered a tank. In smaller scale embodiments the container 1 will be a smaller volume often referred to as a bottle. The purge gas container selected must meet other safety requirements and hence will likely be equipped with a properly rated shutoff or isolation valve as designated in mechanical engineering safety standards for use in applications where it is used to open or close the supply of compressed purge gas such as CO2. The embodiment chosen and design considerations may also merit use of a system pressure relief valve to prevent container 1 overpressure.

The tubing 3 shown in FIG. 1 should be selected giving consideration to the material suitability and rating required for the system operating conditions. Additionally, as previously disclosed, overpressure protection should be included as necessary. The tubing, which may be flexible or rigid tubing, depending upon the application needs, is used to connect the outlet of the purge gas container 1 to a nozzle 4 on the carburetor. It should be understood that in other embodiments, when being applied to engines or internal combustion devices that are not carbureted, the point of connection to an intake manifold will be a different configuration, but still within the contemplated invention disclosed herein.

The nozzle 4 is a mechanical device that, by its throat size and, perhaps a venturi inner shape, serves to set the direction and velocity of the purge gas when entering the carburetor or intake manifold. The nozzle 4 may be made of metal or any other material suitable for the operating condition requirements of the engine or other internal combustion device. In the embodiment shown in FIG. 1 the nozzle 4 is directing the purge gas into the center of the carburetor inlet. In variations to this embodiment, the nozzle may be located where needed to conform to other design considerations, such as directly on the intake manifold, as long as it enables the rapid introduction of the purge gas into the carburetor or intake manifold. It can be attached to the carburetor cover, which in the case of marine applications, there may be a flame arrestor over the carburetor, or by any means necessary to direct the purge gas into the carburetor inlet.

Specific embodiments of the nozzle 4 might need to consider the following requirements: Setting up the angle of injection to direct the CO2 into the carburetor inlet as efficiently as possible, while minimizing interference with normal operation; And; utilizing an attachment mechanism which precludes the introduction of any foreign parts into the carburetor during normal operation or during operation of the purge system. One approach in many marine applications is to fit the nozzle 4 over the "flame arrestor" hold down threaded rod, and hold the nozzle in place with a nut as illustrated in greater detail in FIG. 2.*a*. However, the orientation of nozzle 4 in FIG. 2*a* is not limiting and, as further illustrated in FIG. 2.*b* and previously disclosed, nozzle 4 may be located anywhere near the inlet, provided the purge gas is directed to the inlet for rapid purge of the carburetor or intake manifold and the carburetor or intake manifold is held down with threaded rod 26 and hold down device 27.

The purge gas bottle 3 location will depend upon the type of actuator used to open and close the valve and therefore the supply of purge gas. The valve actuator can be configured to be operated locally or operated remotely. If operated locally, the valve and handle 2 are typically mounted on the CO2 purge gas bottle 1, which requires the bottle 1 to be conveniently mounted where the vehicle operator can open or close the valve 6 from their normal operating position (i.e. The driver's seat). If remote actuation is provided, the CO2 bottle 1 could be mounted in any convenient storage location and remote actuation method chosen have a lever, handle or pushbutton located near the operator to initiate the purge gas in the system. Either mechanical or electro-mechanical devices would be added to the FIG. 1 embodiment to support remote operation.

Figure 2A:
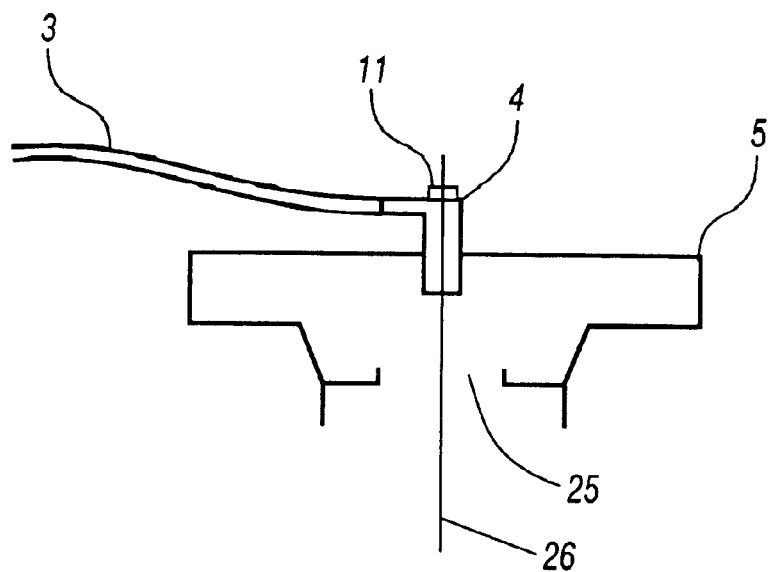
FIG. 2.$a$ is an expanded view showing an embodiment where the system outlet nozzle held is in place on a flame arrestor/carburetor inlet using an existing hold down threaded rod and nut.
Figure 2B:
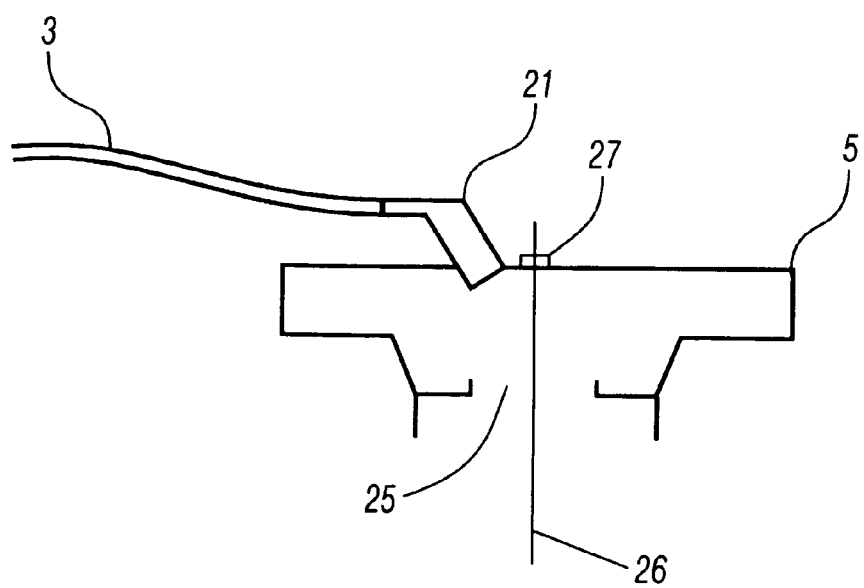
Figure 2C:
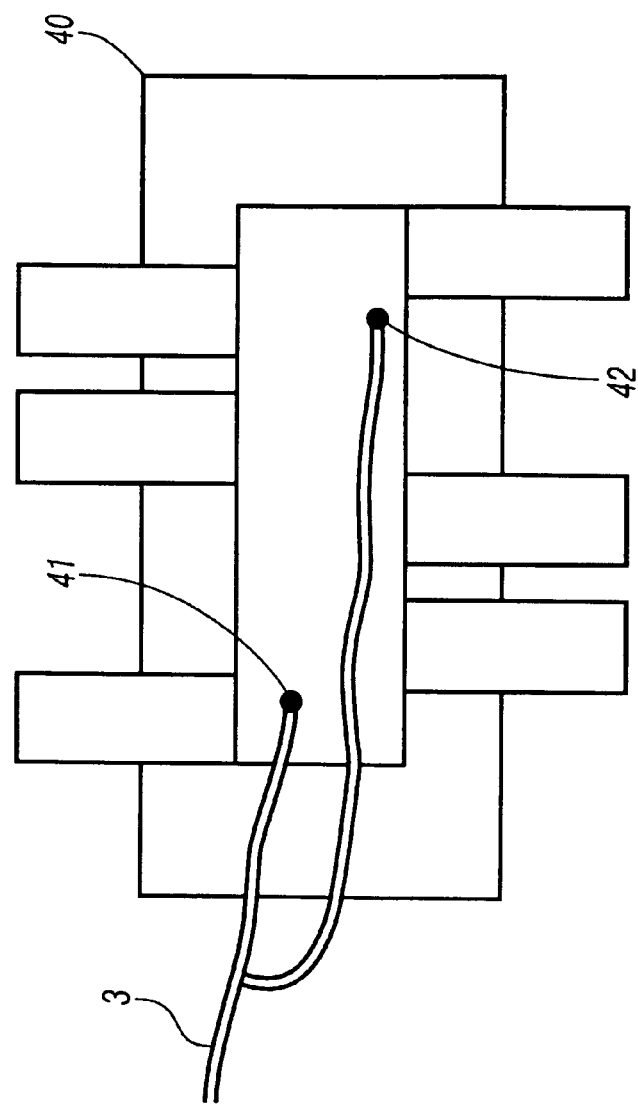

FIG. 2.*a* is an expanded view showing an embodiment where the system outlet nozzle 4 held is in place on a flame arrestor/carburetor inlet using an existing hold down threaded rod 26 and hold down device 11, which in the illustrated embodiment is a nut. In this configuration, the nozzle 4 is located directly above the center of the carburetor inlet 25 and directs the gas straight down. A person of skill could appreciate that alternate orientations and methods of fastening the nozzle 4 could be used and still accomplish the rapid introduction of purge gas into the carburetor or intake manifold.

FIG. 2.*b* shows an embodiment with a variation of location for the nozzle 4 depicted in FIG. 2.*a*. In this configuration, the modified nozzle 21 is not located directly above the carburetor inlet and therefore is designed to inject the gas at an angle, as opposed to the straight down direction shown in FIG. 2*a*, such that the purge gas is still directed towards the carburetor inlet. The nozzle 4 design is intended to reduce the amount of gas needed by ensuring the flow is directly to the carburetor inlet in a manner that bypasses any obstructions and is rapidly dispersed into the carburetor inlet.

FIG. 2.*c* shows an arrangement where the purge gas is introduced directly into an engine intake manifold or plenum 40. The FIG. 2.*c* embodiment shows the purge tubing 3 as a split line format with two manifold inlet locations 41 and 42. Any embodiment using a single inlet location, two as shown in FIG. 2.c, or more locations might be used depending on the need for dispersal of the purge gas throughout the intake manifold or intake plenum necessary to cause the rapid purge of intake air-fuel. In an alternate embodiment, the inlet location could be located at a mechanical spacer between the carburetor and the manifold and implemented without changes to the intake manifold.

Figure 3:
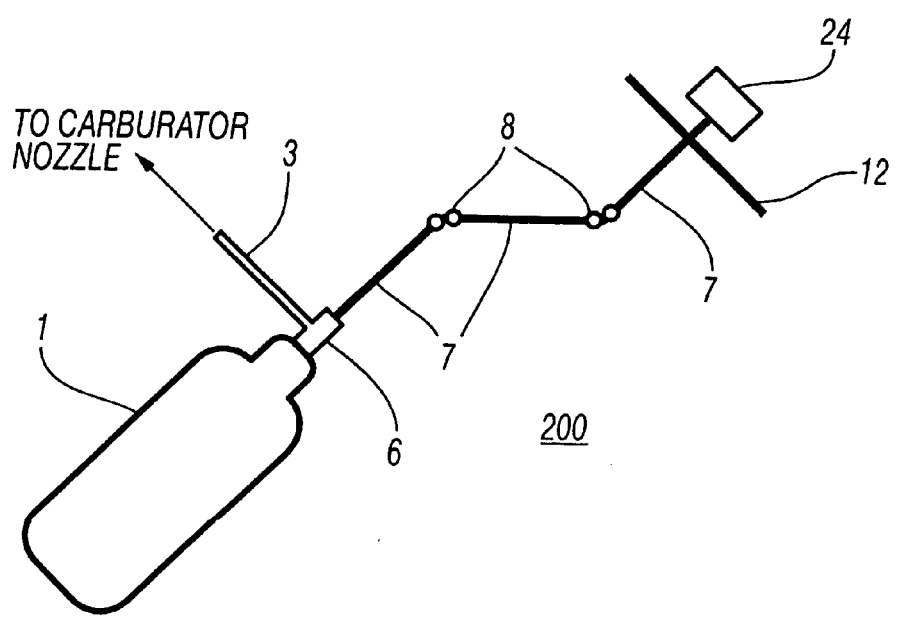
FIG. 3 shows a mechanical extension device used to transfer rotary motion and torque to remotely open and close the valve on the purge gas container

FIG. 3 shows a mechanical extension device 200 used to transfer rotary motion and torque to remotely open and close the valve on the purge gas container 1. Rotation of the valve actuator handle 24 located on a console or dash 12, or other suitably convenient location, enables the operator to remotely cause the valve 6 on the purge inert gas container 1 to open or close. The valve 6 could be one that has a threaded stem that transfers rotary motion into linear movement that opens and closes the valve, or it could be a quarter-turn valve, such as a ball valve, that also relies on rotary motion to open or close. The operator would then only have to operate the valve open for a very short duration. As previously disclosed in other embodiments, the valve 6 might also be a metering valve that allows a specific volume or open timing prior to shutting off the flow from the purge container. The valve 6 could also be located anywhere along the path of tubing 3 provided there is a means for its manipulation to the open, closed or proper regulation position or setting needed to accomplish the rapid purge.

In the embodiment depicted in FIG. 3, the torque is transferred from the actuator handle 24 through rigid extension rods 7 and the universal joints 8 are used as needed to adjust for misalignment between the valve 6 and the actuator handle 24. The rotary motion could be transferred by other configurations that use rigid cables, gear boxes or other means suitable to provide adequate torque transfer and allows for purge gas flow and purge gas isolation following the discharge of an adequate amount of purge gas from the container 1 to the tubing 3.

Figure 4:
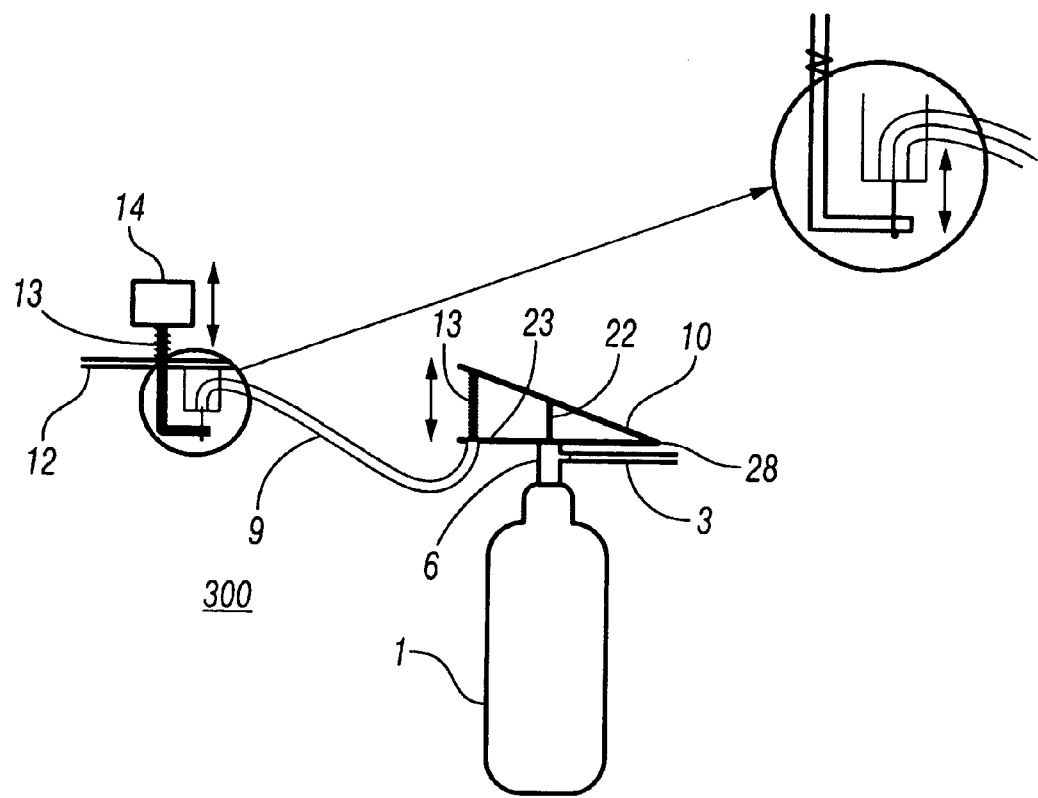
FIG. 4 shows a mechanical actuation means used with a flexible cable control embodiment used to transmit mechanical force or energy by the movement of an inner cable and a lever feature to remotely open and close the purge gas container valve.

FIG. 4 shows an alternate embodiment comprising a mechanical actuation means 300 comprised of a mechanical input device 14 and a flexible cable control used to transmit mechanical force or energy by the movement of an inner cable and a lever feature to remotely open and close the purge gas container valve. The mechanical input device 14 may be a lever, handle, or pushbutton as necessary to any specific application of the invention disclosed herein.

In the embodiment illustrated in FIG. 4, the system 300 comprises a mechanical input device 14 with a flexible cable control 9 used to transmit mechanical force or energy by the movement of an inner cable and a hinged device 23, 22 and 10 to remotely open and close the valve 6 on the purge gas container using linear motion. The flexible cable control may be known to persons of skill as a Bowden cable, but this association is not intended to limit the scope of this embodiment in any way. In this embodiment, pushing the button 14 will cause the upper lever arm 10 to move towards the lower lever arm 23 thereby causing the valve stem 22 to open the valve on the purge gas container 1. The upper lever arm 10 and the lower lever arm 23 are connected by a pivot point 28 as shown in FIG. 4. The embodiment illustrated in FIG. 4 uses an alternate valve 6 design that operates by direct linear motion of the valve stem. This motion causes the valve 6 to open and close such as the pin valve found on smaller CO2 or other compressed gas containers 1. Alternately, this embodiment could be configured to require the lever or pushbutton 14 to be pulled in order to actuate the valve and cause the flow of purge gas from the container 1 through the tubing 3 to the combustion air intake of the device being stopped. In these types of "push" configurations, springs 13 are used as necessary to return the mechanism to the "closed" position. As with previously described embodiments, the valve 6 could also be located anywhere along the path of tubing 3 provided there is a means for its manipulation to the open, closed or proper regulation position or setting needed to accomplish the rapid purge.

Figure 5:
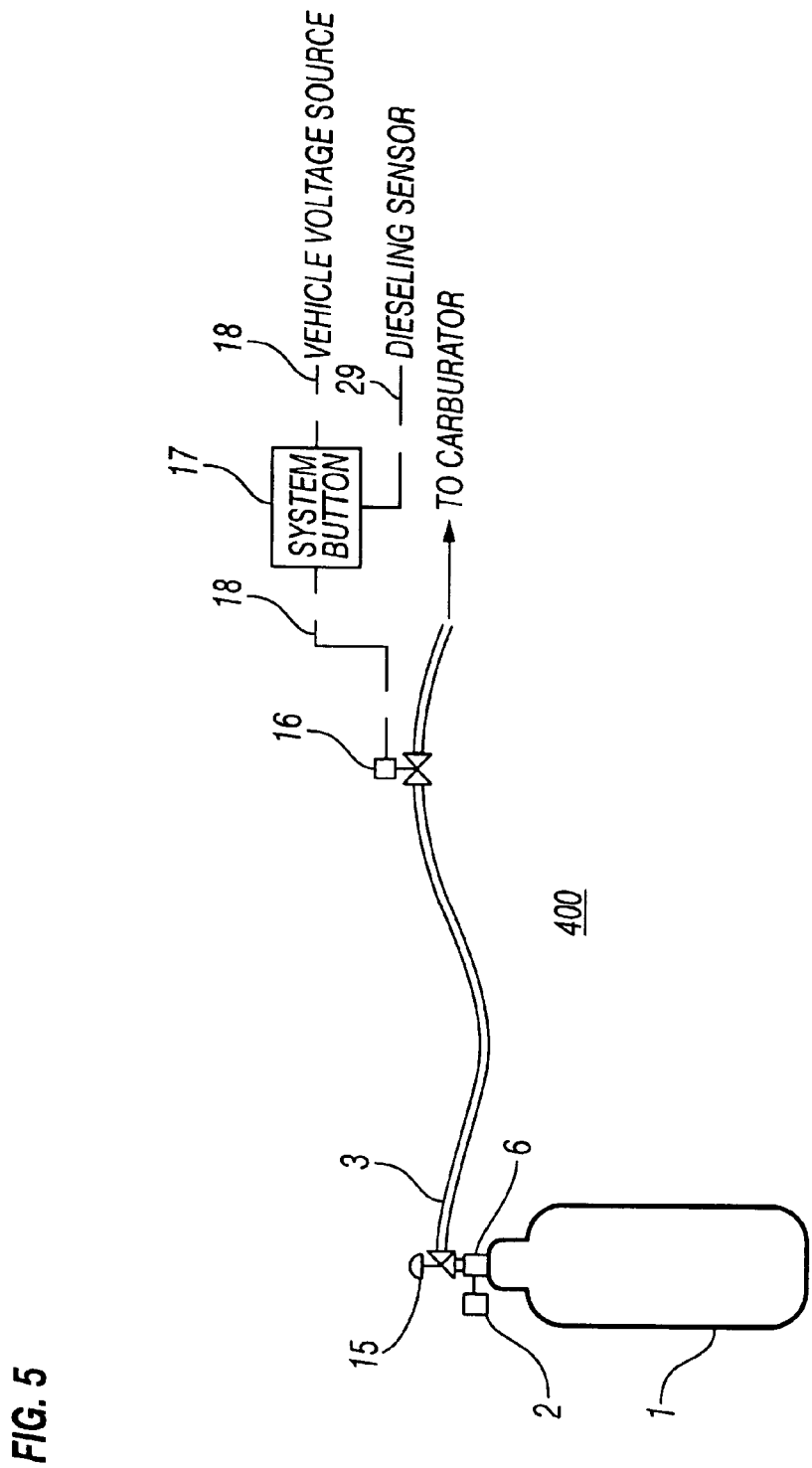
FIG. 5 shows an electro-mechanical actuation embodiment to remotely control the flow of purge gas from the gas container.

FIG. 5 shows an embodiment using an electric pushbutton system 400 to remotely control the flow of purge gas from the CO2 container, by control of an electrically actuated valve 16. Pushing the button 17 causes the electrically actuated valve 16 to open and permits the flow of purge gas. Releasing the pushbutton closes the valve and stops the flow of purge gas. FIG. 5 also shows a regulator 15 that would be included as necessary to meet the pressure limitations of downstream components such as the electrically actuated valve and the tubing. In an alternate embodiment, the system button could be aligned to actuate 15 a purge gas container shutoff or pressure regulation valve that in previous embodiments was manually controlled.

In another embodiment, the system button could be replaced or augmented by an automated control system that senses engine operating conditions where dieseling is likely to occur and automatically injects or enables operator actuated injection of a controlled volume of purge gas when the engine shut-off command is given via the "OFF" switch. Sensed conditions could include engine temperature, exhaust gas flow or gas monitoring or other operating variable that indicates the conditions for dieseling are present. In an alternate embodiment, an engine RPM indication provides the indication that the engine or system is continuing to operate after the ignition is in the OFF position. This automatic arming of the controls would enable the system to be designed to operate to actuate and interrupt dieseling without operator involvement to arm the system as part of the engine shutdown process. In an alternate embodiment, the actuation switch and arming could be included in the ignition switch contacts to actuate the system as part of engine shutoff via a special setting on the engine ignition switch or as a normal engine shutdown feature. These alternate embodiments enable a fully automatic, sensed condition actuation; operator initiated actuation using separate switches or buttons; or routine actuation as part of normal shutdown every time the engine is stopped. A person of skill could appreciate that any of these options can be implemented and be within the contemplated scope of the invention disclosed herein.

A remote electrical actuator is an alternate embodiment that would use a switch or pushbutton 17 located near the engine operator (i.e. Located on the dash as was illustrated in FIG. 3). The switch or pushbutton 17 could control an electric actuated valve on or downstream of the CO2 container, such as an electric solenoid valve 16 that is powered by the vehicle voltage 18. When the switch/pushbutton is operated ON and OFF, it causes the actuator to open and close the supply of purge gas. The CO2 container is connected to the carburetor with tubing 3 as described in previously disclosed embodiments. As previously disclosed, a pressure regulator may be needed to meet the pressure rating of the tubing, valve and any other pressurized components. This pressure regulator 15 is shown in FIG. 5.

The tubing 3 between the purge gas bottle 1 and the injection nozzle 4 can be routed to adapt to design needs not shown in the illustrations of this application and be within the contemplated scope of the invention. Selection of the tubing 3 needs to consider the service conditions in terms of the operating pressures and temperatures in the proposed configurations, material compatibility, as well as vibration or other fatigue that may impact the working life of the implementation.

If a remote actuator is used, this will involve mounting a switch, lever, handle, or pushbutton on the dash or any convenient location within reach of the engine operator. While not absolutely necessary, the remote actuator pushbutton device 17 used should be a "spring return" type 13 such that it will cause the flow of CO2 while force is applied and stop the flow of CO2 when the force is removed.

In a further and alternate embodiment, the need for purge bottle change out could be avoided if some of the combustion exhaust gases created during normal operation were stored in a container, and then injected into the carburetor when "dieseling" was occurring. The post-combustion exhaust gases contain a large percentage of purge gases (e.g., CO2, N2, other gas previously disclosed) and would also displace oxygen if injected into the carburetor. This approach is illustrated in system 500 shown in FIG. 6.

FIG. 6 depicts an appropriately sized container mounted near the engine exhaust manifold. The container 20 and tubing 3 in this embodiment will likely need to be rated for the exhaust gas temperature and pressure of the engine. In this embodiment, a metal or other appropriately rated tubing material 3, and a check valve 19, connects the container to the exhaust manifold such that some of the exhaust gases will flow to and be stored in the container. An inlet filter not shown in FIG. 6 may be needed to improve the quality of the purge gas stored in the container.

In the embodiment illustrated in FIG. 6, the container 20 is connected to the carburetor with tubing 3 and using one of the "remote actuator" means previously disclosed to open and close the actuation valve 16. When desired, the engine operator may open the valve to inject the stored exhaust gases into the carburetor. The post combustion, low oxygen gases stored in the container will be admitted to the carburetor and interrupt the combustion in a manner similar to previously disclosed embodiments.

If necessary to ensure adequate flow rates, a compressor not shown in FIG. 6 could be included in the system such that the post-combustion gases are stored at a higher pressure. This would improve the flow during the purge process.

In every application of this invention it will be necessary to ensure materials are used that are capable of performing under the applicable operating conditions, including the pressure, temperature, humidity and loads applied to the materials, as well as comply with any applicable Codes and Standards in effect. Additionally, if commercially available hardware is used, then follow any recommendations from those manufacturers.

Variations of the embodiments previously disclosed can be achieved using the following embodiment details or feature considerations. A person of skill would appreciate the situations where these variations might occur, all while comporting with the scope of the invention disclosed herein. The variations include, but are not limited to:

As previously disclosed the use of flow control devises such as flow restrictions or orifices, flow meters and flow control valves to regulate the flow of the purge gas and allow for the system to be used on a wide range of engine sizes or purge gas volume needs. Additionally, the design of the nozzle 4 can be altered to achieve these objectives without the addition of more individual parts to the system disclosed.

Further automation of the system by use of additional switches, electro-mechanically operated valves, relays or other control devices for system operation, such as causing the momentary flow of purge gas by just placing the engine switch in the "OFF" position and using the "OFF" position signal to actuate the purge system. This integrated implementation would be of assistance to the operator of any vehicle where the system is implemented and simplify its actuation.

In other embodiments, the use of additional sensing instrumentation and controls to foresee a dieseling or run-on situation or the severity of a dieseling situation would be helpful to the system. These may include sensors 29 as shown in FIG. 5 that detect particular engine conditions such as hot engine temperature, higher fuel temperature, combustion when the ignition is off (i.e., dieseling), etc. and use this information to automate the injection of purge gas to those conditions when it is needed and alternately or in combination determining the quantity of purge needed to shutdown the engine.

As previously disclosed for the various embodiments, the nozzle 4 location can be installed in other injection locations such as the fuel intake manifold or anywhere that the purge would eliminate the dieseling condition Alternate embodiments may consider the problem presented by inadvertent actuation. This could be remedied by embodiments that include interlocks to prevent inadvertent actuation, such as requiring the key to be in the "OFF" position, or no spark present, before allowing the injection/purge to occur.

Additionally, embodiments of the system could consider the need to minimize the risk of thermal shock damage by storing the purge gas at a low pressure such that the temperature drop is minimized when the gas is expanded into the carburetor. Yet another embodiment alternative to this would be using a longer length of tubing going to the nozzle, routing along engine exhaust components, or using heating elements that allow the purge gas to be warmed as it travels down the tubing before entering the carburetor.

The operation of the system embodiments disclosed herein is described in the following. A person of skill would appreciate that many variations of this operation might be necessitated by embodiment alternatives disclosed herein, including additional steps not disclosed in the following. As such, this operational description is not limiting with respect to the scope of the invention disclosed in this application.

Considering the embodiment illustrated in FIG. 1, with a filled CO2 or other purge gas bottle 1 and when in manual mode of operation and when called upon to stop a "dieseling" engine, the system is placed into operation by opening the valve 6 until the supply of CO2 commences, and then closing the valve 6 almost immediately but after sufficient flow has occurred to stop the combustion. Typically, only a very short duration supply or burst of CO2 is needed to stop the dieseling problem. To conserve the supply of purge gas and minimize the amount of cold expanded gas rapidly injected into the engine, and hence the damage that may occur due to thermal shock, the operator likely wants to only inject the minimum amount of CO2 necessary to interrupt combustion. A recommended sequence of steps could be to turn the key of the operating engine or other power cycle system to "OFF" and check for a dieseling or run-on problem, proceed with a shot or injection of the desired amount of CO2 purge gas when and as needed by opening then closing the CO2 container valve 6. Through trial and error the operator will determine the amount of CO2 needed and when dieseling or run-on conditions are likely.

With the "remote actuator" embodiment, the operation is somewhat automated by placing the system 400 (see FIG. 5) into operation by manipulating the switch, lever, handle, or pushbutton 17 depending on the embodiment. The quantity and sequence of steps for controlling the purge are as discussed for the "manual mode" example previously presented.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A gaseous injection system for terminating continued operation in an internal combustion engine, comprising:
   a. a gas container providing purge gas in a quantity of purge gas sufficient to rapidly interrupt the combustion in the internal combustion engine,
   b. a controllable flow device for initiating and terminating purge gas flow from the gas container,
   c. tubing connecting the gas container to a mechanical fitting capable of directing the purge gas into the combustion air intake of the internal combustion engine,
   d. the mechanical fitting is a spread nozzle to enable a rapid purge of the combustion air intake volume of the engine,
   e. the nozzle is a venture at the point of entry the engine combustion air intake,
   whereby the operator of the engine can controllably introduce purge gas flow into the air intake and rapidly alter the air-fuel mixture to suppress combustion.

2. The gaseous injection system of claim 1, in which the gas container is at a very high pressure relative to the combustion air intake of the engine and the controllable flow device enables rapid expansion of the gas such that the gas directed into the combustion air intake is at a significantly lower temperature relative to the ambient operating conditions of the engine.

3. The gaseous injection system of claim 1, in which the controllable flow device enables metered flow amounts to be actuated by the operator.

4. The gaseous injection system of claim 3, in which the controllable flow device includes a metering flow orifice.

5. The gaseous injection system of claim 1, in which the purge gas is either carbon dioxide, nitrogen, argon, helium, or mixtures thereof.

6. The gaseous injection system of claim 1, in which the purge gas is taken from a stream of engine exhaust gases which have been collected in the gas container.

7. The gaseous injection system of claim 6, in which the recycled exhaust gas collected for purge gas has been compressed by a compressor to a pressure significantly higher than the engine combustion air intake pressure.

8. The gaseous injection system of claim 1, in which the tubing is routed across and attached to the engine in a thermally coupled manner to enable engine heat to warm the purge gas prior to it exiting from the mechanical fitting.

9. The gaseous injection system of claim 1, in which the controllable flow device can be operated by a remote mechanical mechanism accessible by the engine operator.

10. An apparatus for operating a gaseous injection system for terminating continued operation in an internal combustion engine, comprising:
    a. a gas container providing purge gas in a quantity of purge gas sufficient to rapidly interrupt the combustion in the internal combustion engine,
    b. an electro-mechanical controllable flow device for initiating and terminating purge gas flow from the gas container on demand,
    c. tubing connecting the gas container to a mechanical fitting capable of directing the purge gas into the combustion air intake of the internal combustion engine,
    d. in which the electro-mechanical controllable flow device is operated by a push button actuation enabling the flow device to allow flow for as long as the push button actuation is depressed,
    e. and an interlock control circuit with the engine ON/OFF switch that inhibits system operations unless the engine ON/OFF switch is in the OFF position,
    whereby the operator of the engine can controllably introduce purge gas flow into the engine combustion air intake and rapidly alter the air-fuel mixture to suppress combustion.

11. The apparatus for operating a gaseous injection system of claim 10, in which the electro-mechanical controllable flow device is a metering valve.

12. The apparatus for operating a gaseous injection system of claim 10, in which the electro-mechanical controllable flow device is operated by a push button that actuates only a metered amount of purge gas flow.

13. The apparatus for operating a gaseous injection system of claim 10, in which the mechanical fitting is a spread shaped nozzle to enable a rapid purge of the combustion air intake volume of the engine.

* * * * *